United States Patent [19]
Grosch et al.

[11] Patent Number: 5,268,692
[45] Date of Patent: Dec. 7, 1993

[54] SAFE STOPPING DISTANCE DETECTOR, ANTENNA AND METHOD

[76] Inventors: Theodore O. Grosch, 744 Princeton Blvd., Apt. 16, Lowell, Mass. 01851; Wojciech Klimkiewicz, 360 McBath St., State College, Pa. 16801; Peter J. Moosbrugger, 203 Fernwood Ct., State College, Pa. 16803

[21] Appl. No.: 852,860

[22] Filed: Mar. 17, 1992

Related U.S. Application Data

[63] Continuation-in-part of Ser. No. 669,054, Mar. 14, 1991, abandoned.

[51] Int. Cl.⁵ .................... G01S 13/60; G01S 13/34; G01S 13/38
[52] U.S. Cl. ........................ 342/70; 342/129; 342/130
[58] Field of Search ............ 342/70, 71, 72, 120, 342/122, 125, 128, 129, 130

[56] References Cited

U.S. PATENT DOCUMENTS

| | | | |
|---|---|---|---|
| 3,846,796 | 11/1974 | Oishi et al. | 342/83 |
| 3,905,031 | 9/1975 | McCord | 342/25 |
| 4,203,113 | 5/1980 | Baghdady | 342/71 |
| 4,348,675 | 9/1982 | Senzaki et al. | 342/71 |
| 4,388,622 | 6/1983 | Fletcher, Jr. | 342/112 |
| 4,503,433 | 3/1985 | Tomasi | 342/87 |
| 4,543,577 | 9/1985 | Tachibana et al. | 342/70 X |
| 4,973,967 | 11/1990 | David et al. | 342/122 |
| 5,134,411 | 7/1992 | Adler | 342/130 |
| 5,181,037 | 1/1993 | Komatsu | 342/70 |
| 5,181,038 | 1/1993 | Asbury et al. | 342/70 |

Primary Examiner—John B. Sotomayor
Attorney, Agent, or Firm—Moss, Barrigar & Oyen

[57] ABSTRACT

An FM/CW radar system is disclosed for determining a safe stopping distance between a moving vehicle and a potential obstacle. The radar signal is modulated linearly over several slopes. A microstrip phased array transmit/receive antenna is also disclosed having a hybrid tap, corporate feed structure. Signals from the antenna are amplified and filtered, and passed through an analog to digital converter to a signal processor, which performs a Fast Fourier Transform on the signals to convert them from time domain data to frequency domain data. The frequency domain data is then used to solve target range and doppler equations, determine safe stopping distances, and sound or display alarms if the safe stopping distance has been violated. A sensitivity control adjusts for road conditions or operator reaction time variations.

17 Claims, 14 Drawing Sheets

SAFE STOPPING DISTANCE DETECTOR, ANTENNA AND METHOD

RELATED APPLICATIONS

This is a continuation-in-part of application Ser. No. 07/669,054 filed on Mar. 14, 1991 now abandoned.

FIELD OF THE INVENTION

The present invention relates to a radar safe stopping distance detector and associated antenna for use in an automobile. More specifically, the present invention relates to a device for detecting the distance between an automobile and an object in proximity thereto in order to determine a safe stopping distance therebetween and to issue a visible and/or audible alarm when the actual distance therebetween is less than the safe distance between the vehicle and an object ahead.

BACKGROUND OF THE INVENTION

Automobile traffic increases each year in most countries. With this increased traffic, there is a corresponding rise in automobile accidents. Furthermore, increases in traffic continue to tax overcrowded road systems far beyond their designed capabilities. Increased loads, crumbling roadways and faster moving traffic all increase the risk of an accident. Nevertheless, in most situations, drivers are either unaware of or ambivalent to the fact that they are travelling too close to a vehicle in front of them to stop in case of a sudden stop. It is estimated that one half of the total cost of automobile accidents is a result of rear end collisions.

An efficient collision warning system can alert drivers to react and adjust their driving habits in order to avoid most collisions and save at least $25 billion annually in traffic accident costs, injuries and fatalities.

Many researchers have investigated the automotive collision warning field. However, the devices produced in past for this purpose suffer from several problems, such as high false alarms, real targets being ignored, target ambiguity in a dense environment and slow operation.

Radar is best known in a pulse form. A pulse of radio energy is emitted and the radar receiver listens for a reflected return pulse from a target. When this pulse is received, the time interval is noted so that the distance can be calculated. The ability of the radar to resolve distance is limited to the length of the pulse. Automotive radar requires a range resolution of approximately 3 meters. This would require the pulse to be less than 10 nanoseconds long, given the average space between automobile and potential obstacles. A system of this type would be very costly to implement in a millimeter wave transceiver. A number of devices have been proposed which utilize pulsed radar. These include Kubota et al., U.S. Pat. No. 3,787,845, issued Jan. 22, 1974 and Ban et al., U.S. Pat. No. 3,898,653, issued Aug. 5, 1975. Each of these devices shares this shortcomings of pulsed radar.

The high rate of false alarms, which is generally associated with these pulse radar devices, is primarily caused by the multitude of road features that do not present a danger to the vehicle but which may momentarily appear to be a dangerous object to a detection system. These include guard rails, signs, buildings, overpasses and vehicles in other lanes. These objects reflect and scatter radio waves. The amount of reflection and scattering that is produced by these objects cannot generally be predicted or modeled. For example, it is very difficult for small pulsed radar units to distinguish between a car and a sign or guard rail.

The size of previous radar units has also been a problem. The radar's ability to distinguish angular direction is primarily dependent on the size of the antenna as compared to the wavelength of the radio frequency used. A larger antenna has a narrower beam and can therefore distinguish objects with greater precision. The antenna can be made smaller, but this requires much higher frequencies to be used and high frequency devices are usually very expensive and difficult to produce.

Lastly, the time required by the radar system to acquire a target and determine its velocity and distance is critical to the effectiveness of the unit. The multitude of targets and the high relative speeds found in highway driving introduce a time constraint on the speed of the signal processor. In the past, these units have been slow to react and easily confused.

There remains, therefore, a need in the art for a compact and simplified radar system which can be utilized to accurately predict an optimum space cushion between a vehicle and potential obstacles.

SUMMARY OF THE INVENTION

The present invention has a small antenna, and a digital signal processor with a special method of target detection and characterization to significantly reduce false alarms and improve target selectivity.

According to one aspect of the invention, there is provided a safe stopping distance detector for a host vehicle. The detector comprises an oscillator for generating continuous wave electromagnetic radar output signals. A modulator is operably coupled to the oscillator to modulate the output signals. A signal processor is operably coupled to the modulator to cause the modulator to produce multiple slope output signals to emanate from the oscillator. A transmit antenna is adapted to be located for the transmission of radar signals in a predetermined direction. A power splitter is electrically connected between the oscillator and the transmit antenna. A receive antenna is adapted to be located to receive radar signals emanating from the transmit antenna and reflected off an obstacle. A mixer is electrically coupled between the power splitter and the receive antenna for processing beat frequencies for each modulation slope. The signal processor is electrically coupled to the mixer, the signal processor including means for analyzing the beat frequencies to identify the obstacle, means for calculating the distance to the obstacle, means for determining if the host vehicle can stop within such distance. Also, means is coupled to the signal processor for producing an alarm if the host vehicle cannot stop within such distance.

According to another aspect of the invention, there is provided a method of determining a safe stopping distance between a host vehicle and a target object. The method comprises the steps of providing a continuous wave, frequency modulated radar device on the host vehicle to transmit and receive radar signals reflected off the object. The radar signal is modulated to produce a plurality of modulation slopes. The transmitted signal is matched with the received signal to produce beat frequencies corresponding to the delay between such signals for each modulation slope. The beat frequencies are converted to digital data. A Fast Fourier Transform is performed on the digital data to produce frequency domain data. The frequency domain data relative to each slope is matched to identify the target object. The distance to the target object and the distance to stop the host vehicle is calculated, and an alarm is emitted if the distance to the target object is less than the host vehicle stopping distance.

According to yet another aspect of the invention, there is provided a planar phased array radar antenna comprising a linear microstrip feed line having a plurality of spaced-apart, hybrid taps located therealong. Each tap has opposed branches. A corporate feed array is coupled to each branch of the hybrid tap, each corporate feed array having a pair of branches. Also, a microstrip patch is coupled to each corporate feed array branch.

Preferred embodiments of the invention will now be described by way of example with reference to the accompanying drawings, in which:

Figure 1:
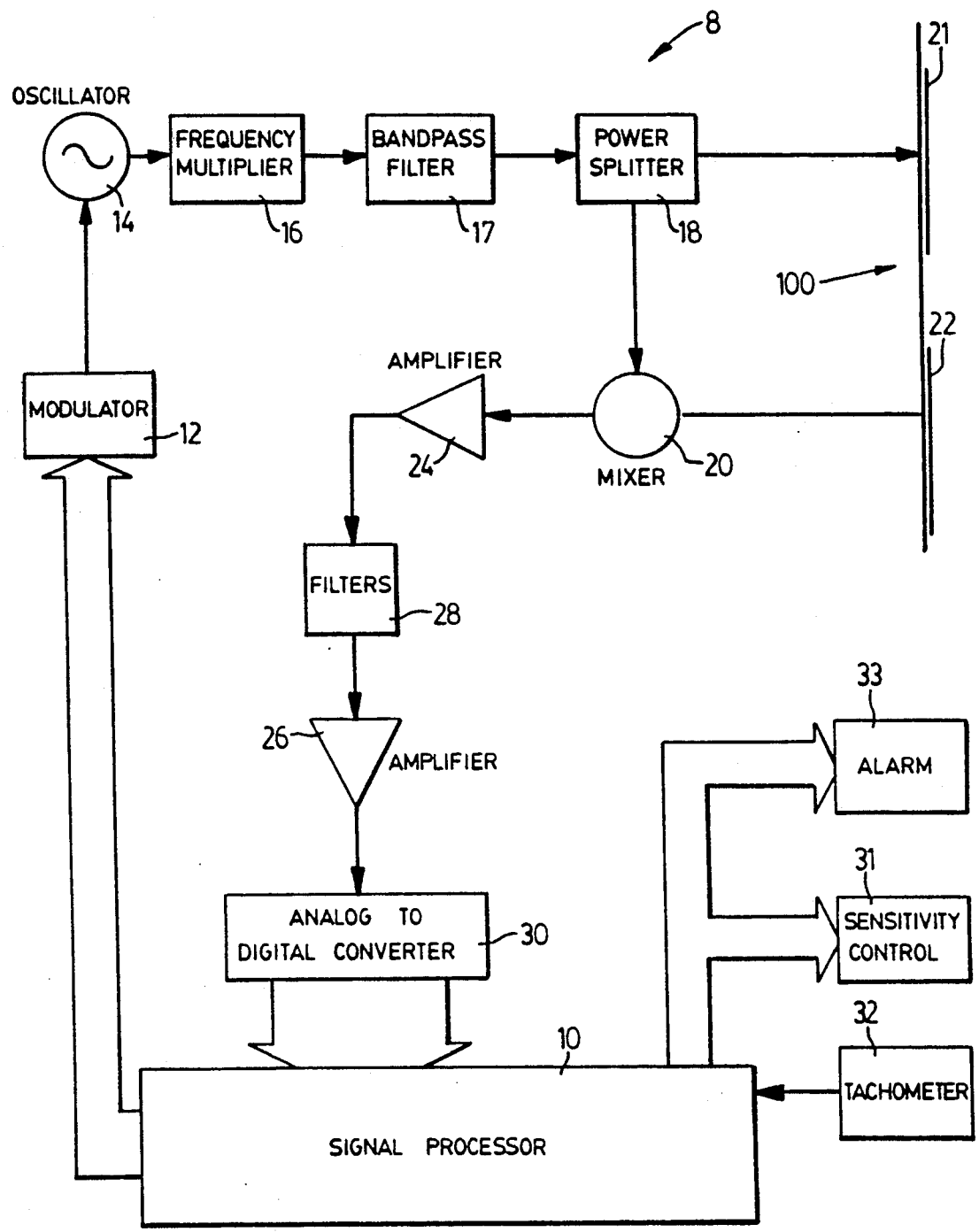
FIG. 1 is a diagrammatic representation of a preferred embodiment of an automotive safe stopping distance detector according to the present invention.
Figure 6:
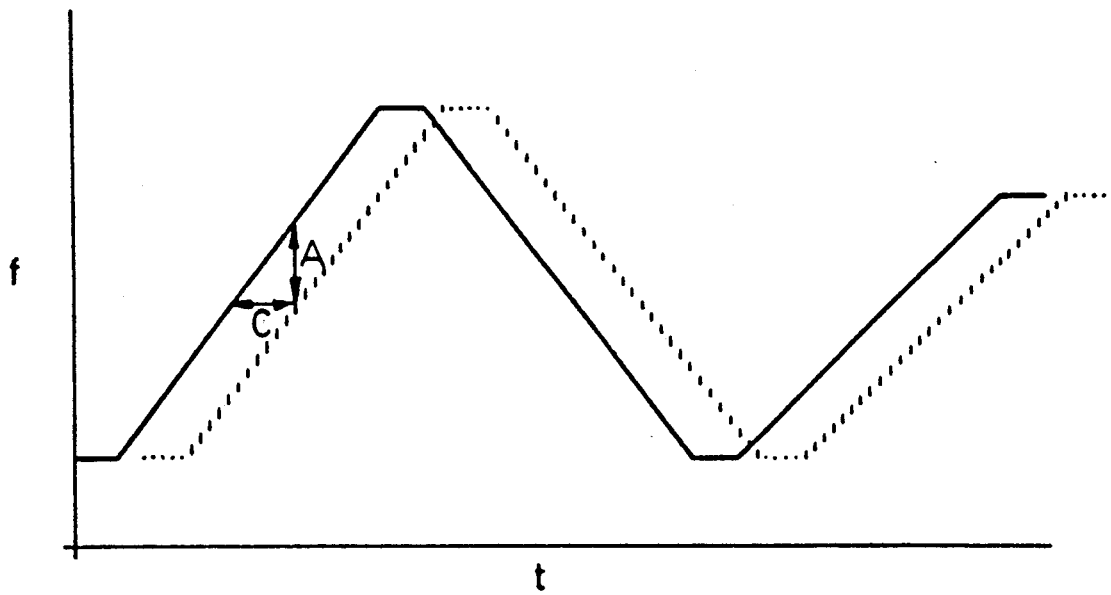
FIG. 6 is a graphical representation of the detector output and input.

DESCRIPTION OF THE PREFERRED EMBODIMENT:

The safe stopping distance detector of the present invention is generally indicated by reference numeral 8 in FIG. 1 and operates using frequency modulated, continuous wave (FM-CW) radar, in which the frequency of the radar is modulated linearly over time. Referring firstly to FIG. 1, a signal processor 10, which is preferably a digital signal processor, chooses a desired modulation slope for the radar signal and commands a modulator 12, which in turn alters the radar transmission of an oscillator 14 in a sloped fashion as shown in FIG. 6. A slope up or down in frequency is produced by sending a rising or falling control voltage from modulator 12 to oscillator 14. The oscillator 14 changes the frequency of oscillations proportionally to the control voltage. If oscillator 14 does not produce the desired frequency, an optional frequency multiplier 16 multiplies the frequency of the oscillator 14 as will be described further below.

The oscillator output signal is passed through a bandpass filter 17 and into a power splitter 18, which sends a portion of the output of bandpass filter 17 to a mixer 20 and the remainder to a transmit antenna 21. The received signal is received by a reception antenna 22 and mixed by mixer 20 with the current output signal from bandpass filter 17. The difference between the transmitted and received signals, or beat frequency, is passed to an amplifier 24, then to filters 28 (the purpose of which will be described further below). The output from filters 28 passes through another amplifier 26 and goes to an analog to digital converter 30. The digitized values produced by A/D converter 30 are read by the processor 10 and stored in memory until 128 are collected. The processor then calculates a Fast Fourier Transform or FFT on the sampled data. The FFT calculation converts the signals from time domain data to frequency domain data. The data is then analyzed to determine what frequencies are present and their frequency and power are recorded.

The processor 10 then commands another slope to begin and the above process repeats until a predetermined number of slopes have been completed. The frequencies are matched to yield the distance and Doppler information about each target. The processor 10 then reads the speed of the host vehicle from a tachometer 32 and calculates the minimum or safe stopping distance. If the distance to the target is less than the safe stopping distance, an alarm 33 is triggered. Five levels of alarm are provided, each indicating a higher level of danger. For example, each successive alarm state could be triggered by each addition of two meters of penetration into the safe stopping distance.

A control 31 is optionally provided for sensitivity adjustment to adjust the parameters of the safe stopping distance calculation. The values used can be reduced or increased as desired, to compensate for road conditions, visibility, vehicle physical characteristics and driver reaction time.

The frequency of operation of safe stopping distance detector 8 is preferably about 24.125 GHz. This is high enough to significantly reduce the size of the antenna to about 4 cm by 12 cm. The transmit signal is generated by oscillator 14 which preferably operates at about 12 GHz. This frequency is doubled by multiplier 16 up to about 24 GHz. If desired, a three times multiplier 16 could be used so that detector 8 operates at about 35

GHz. Alternatively, a suitable oscillator 14 could be chosen to operate at any desired frequency, thus eliminating the need for a multiplier 16.

Signal processor 10, preferably is a Texas Instruments digital signal processor, part number TMS 32015. This is a first generation 16 bit digital signal processor that uses a modified Harvard structure with a hardware multiplier. The processor can execute 5 million instructions per second, has 4K of program and data ROM and 256 words of RAM. The data being sent will provide a 64 point complex FFT using internal memory.

Figure 2:
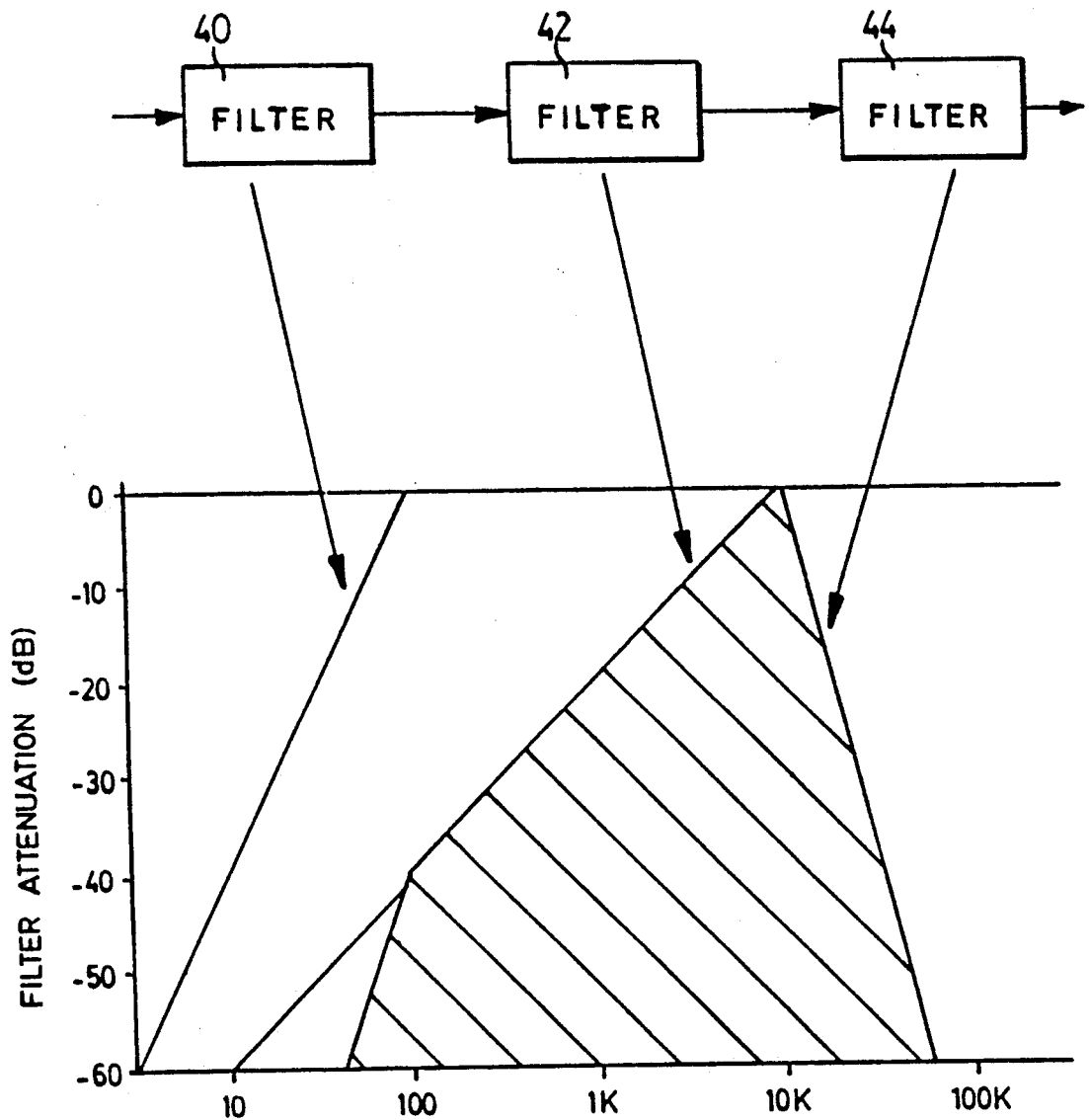
FIG. 2 is a graphical representation of the filter attenuation utilized by the device.

Referring next to FIG. 2, filters 28 include three sub-filters. A high pass filter 40 at 100 HZ is used to provide a 40 dB/Decade roll up, and block DC voltages and very low frequency system generated clutter or SGC. A second high pass filter 42 at 10 KHz is used to provide a 20 dB/Decade roll up over the frequency band. This is done to partially compensate for the target having a 40 dB/Decade roll off with distance. Finally, a low pass filter 44 at 10 KHz is used for anti-aliasing since the A/D sampling frequency is 20 KHz. This filter provides an 80 dB/Decade roll off. The effect of these filters on the signal is graphically represented on the lower portion of FIG. 2. This is a form of automatic gain control, although other forms of automatic gain control could be used if desired.

Figure 3:
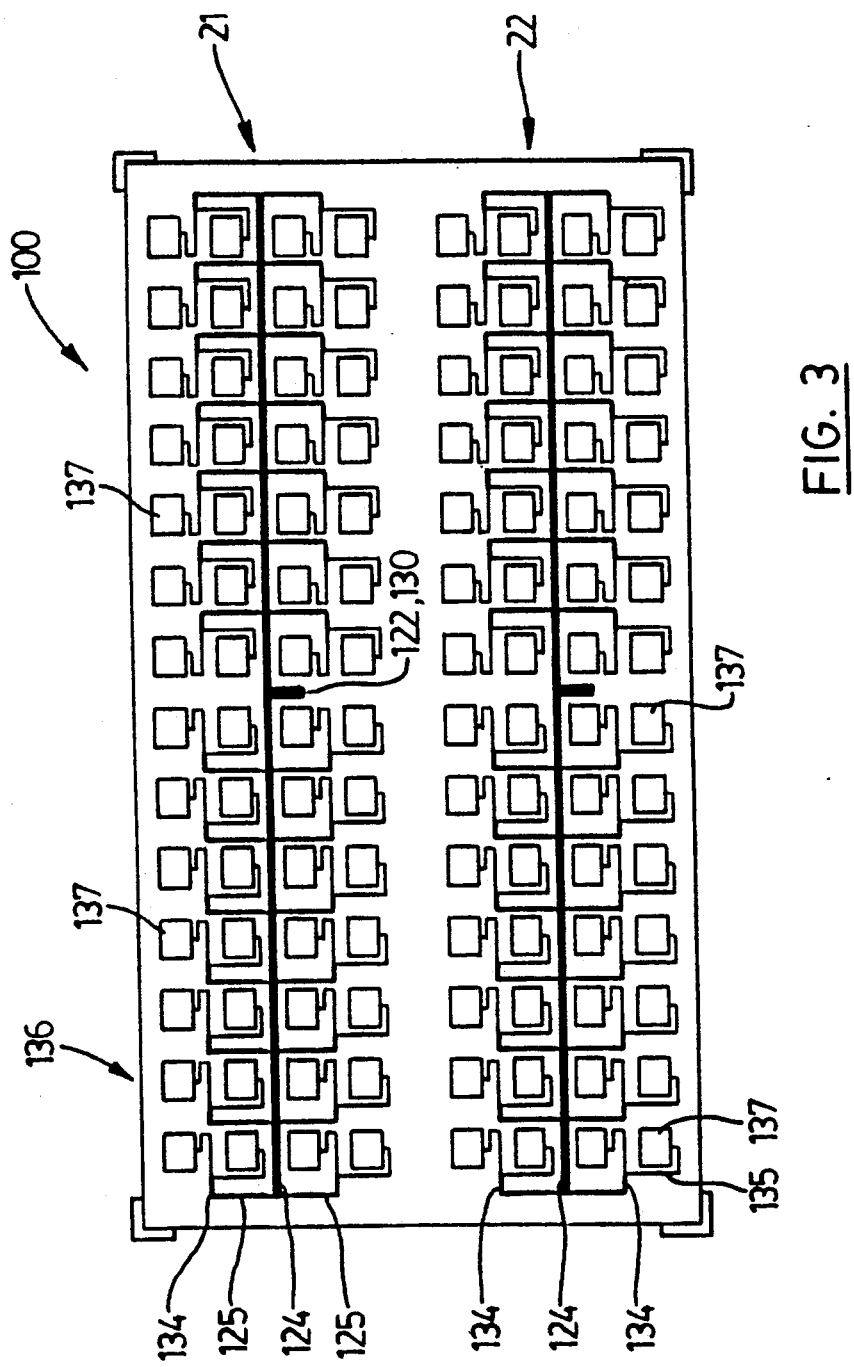
FIG. 3 is a diagrammatic representation of an antenna utilized in the detector.
Figure 4:
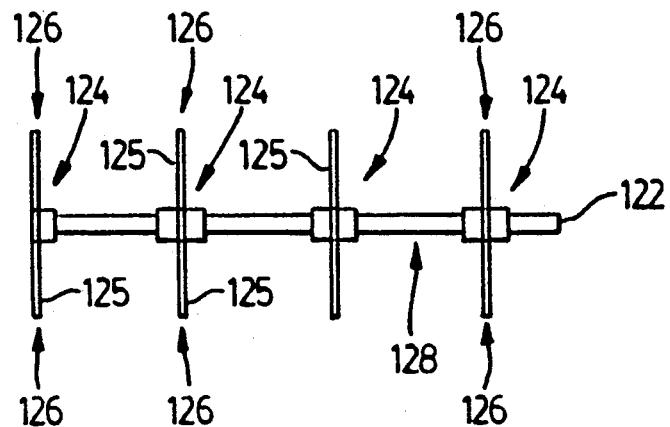
FIG. 4 is an enlarged view of a portion of the antenna of FIG. 3 showing a hybrid tap feed arrangement.
Figure 5:
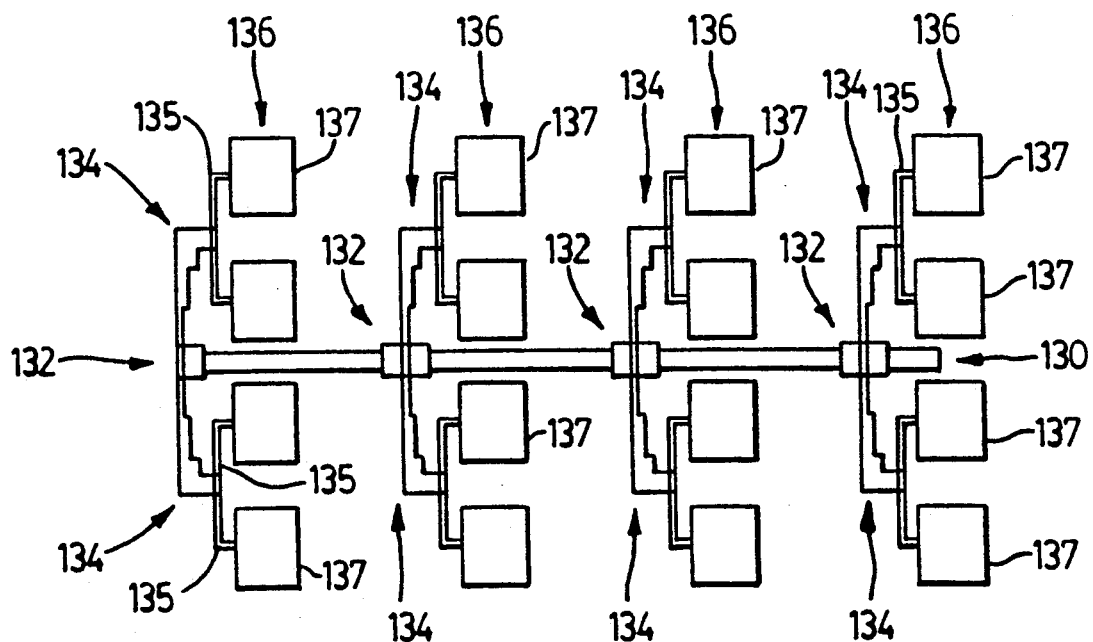
FIG. 5 is an enlarged view of an alternative embodiment of feed arrangement.

Referring next to FIGS. 3, 4 and 5, an antenna utilizing a two dimensional array of microstrip patches is illustrated in FIG. 3 by reference numeral 100. Antenna 100 uses a "hybrid tap" feed structure as shown in FIG. 4, and consists of a linear microstrip feed line 122 with periodic microstrip hybrid taps or power dividers 124 each tap having opposed branches 125. The power in the $i^{th}$ divider or tap 124 is split and is then fed to a patch or an array above and below linear feed line 122 as indicated by arrows 126. A certain predetermined amount of power is then transmitted down the feed line by the microstrip transmission line 128 to the $(i+1)^{th}$ power divider 124. This transmission line 128 can be a fixed phase shift for beam forming or can be replaced by an active phase shifter to add beam steering capabilities to the array. This power splitting and phasing continues until the power reaches the final $n^{th}$ power tap, and any remaining power is either terminated in a matched load or is reflected. This type of feeding structure minimizes microstrip feed losses, thus increasing the efficiency of the array antenna.

An amplitude taper and phase taper can be easily achieved across the array. An amplitude taper varies the amount of current flowing in each patch of the array, and thus varies the amount of power radiated by the elements. This variation in radiated power is used to minimize the side lobe levels of the antenna pattern. The $i^{th}$ power divider can tap the required power to implement the desired amplitude taper across the array. In beam steering, the phase shift between power dividers determines the direction that the antenna beam is pointing.

Several different antenna structures can be made using the hybrid tap feeding configuration of FIG. 4. FIG. 5 shows the hybrid tap feed used with four rows 136 of corporate fed arrays 134. The feed point 130 is connected to power dividers or taps 132, which are similar to dividers 124 in FIG. 4, and which are tapped to feed corporate structures 134 above and below the feed line. These corporate structures or arrays have branches 135 that feed the individual microstrip patches 137. In FIG. 5, the E field is horizontal, but in FIG. 3, the E field is vertical. The latter is preferred in an automotive radar to eliminate unwanted signals from the road and overpasses. Alternatively, a structure like FIG. 5 could be used by turning it 90 degrees.

If desired, the upper portion of antenna 100 could be divided in the center into two halves and fed separately to create a beam steered antenna. If the signal from one half of the array is delayed slightly the antenna can be made to "look" off to one side.

Figure 7:
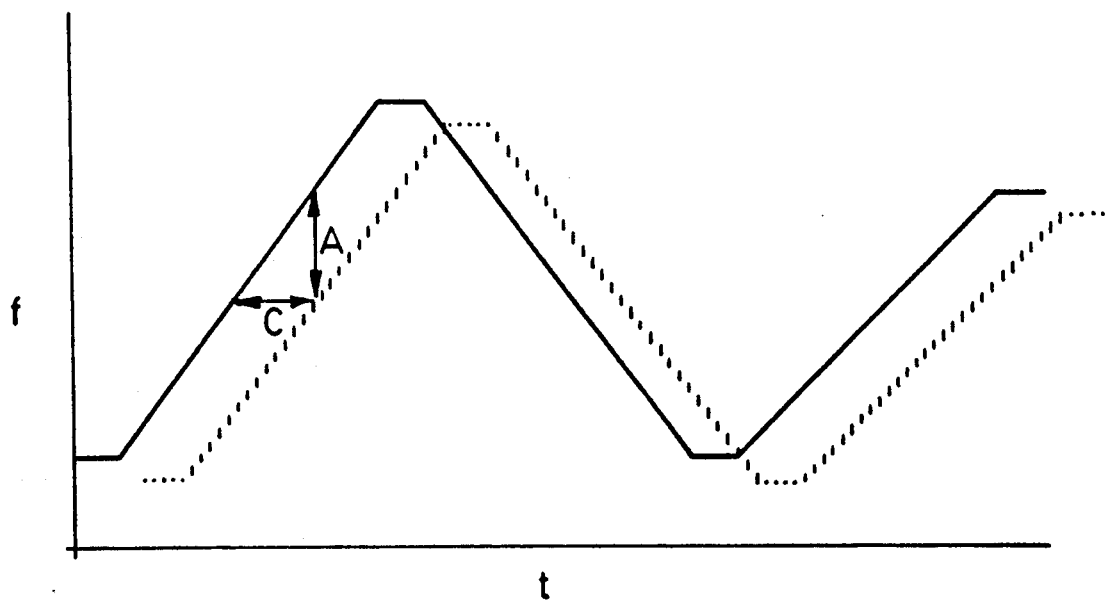
FIG. 7 is a graphical representation of the detector output and Doppler shifted input.

Referring next to FIG. 6, is a plot of the frequency transmitted and received by antenna 100 versus time as shown. The frequency is modulated linearly with time. The solid line in FIG. 3 illustrates the transmitted frequency. The dotted line shows the received frequency. The vertical distance A is the deference or beat frequency. The horizontal distance C is the time it took the radio wave to propagate to the target and back. The range to the target is a function of this beat frequency and for steady state conditions, is expressed as:

$$f_b = 2S\ R/C,$$

where:
 $f_b$ = Beat Frequency
 S = Modulation Slope in Hz/s (Hz per second) as determined by the hardware
 R = Range
 C = speed of light If the target has relative velocity, the received signal frequency is shifted by the Doppler effect. FIG. 7 illustrates a graph of frequency verses time of a transmitted frequency (solid line) and a simulated received signal (dotted line) with Doppler. The steady state expression for the beat frequency under these conditions is:

$$f_d + f_b = \frac{2SR}{C} - 2r/\lambda,$$

where:
 $f_d$ = Doppler Frequency
 r = Relative, Radial Velocity
 $\lambda$ = Wavelength of Radar Transmission
 $f_b$, S, R, C are as above Since there are two unknowns, to reach a solution for range and relative radial velocity, in the above equation, two equations are needed, hence the need for the second sloping frequency shown in FIGS. 6 and 7. The two equations can now be solved to determine the Doppler portion and the range portion. From the Doppler portion or relative radial velocity, the speed of the target vehicle can be determined by subtracting the speed of the host vehicle.

The safe stopping distance (SDD) is calculated using the following formula:

$$SSD = (V_O)(t_R) + D_o + \frac{(V_O)^2}{2a_o} - \frac{(V_T)(|V_T|)}{2a_T}$$

where:
 $V_O$ = own speed (m/s)
 $V_T$ = target speed (m/s)
 $t_R$ = reaction time (s)
 $a_O$ = own or host vehicle deceleration rate (m/s$^2$)
 $a_T$ = target deceleration rate (m/s$^2$)
 $D_O$ = safety margin (distance left over when both vehicles have come to a stop).

The deceleration capability of the target vehicle must be determined and a typical, average value may be utilized if measured data is not available to for each vehicle. Alternatively, an assumption can be made that the deceleration rate of the target vehicle is the same as the host vehicle.

As mentioned above, control 31 can be used to adjust sensitivity of detector 8. Some of the adjustments could be to the assumed deceleration rate of the host or target vehicle, or the reaction time of the driver, or the safety margin An automatic adjustment can also be built in. For example, in the process of the vehicles's own speed measurement, a history can be remembered over a preset time period. If the microprocessor discovers the vehicle is decelerating quickly, it is assumed that the driver has depressed the brake. Because the driver already has the brake depressed, the reaction time needed to depress the brake further is not as great as the reaction time needed to remove the foot from the accelerator and then apply the brake. Alternatively, if the driver is accelerating, it will take more time to apply the brakes. So, if the microprocessor detects braking or acceleration, the coefficient of reaction time in the safe stopping distance equation is changed accordingly.

Detector 8 preferably is designed to operate in the range of 2 to 100 meters. The preferred minimum and maximum ranges of operation, ranges of resolution and relative velocity resolution are shown in the following Table:

| | |
|---|---|
| Minimum Range | 2 m |
| Maximum Range | 100 m |
| Range Resolution | ± 1.5 m |
| Relative Velocity Resolution | ± 2.25 mph |
| Antenna Beamwidth, Horizontal | 5 degrees |
| Antenna Beamwidth, Vertical | 15 degrees |
| Maximum Reaction Time | 0.100 seconds |

Signal processor 10 typically has other input/output ports that are not used by the main microprocessor function and these may be interfaced with temperature sensors, braking systems, cruise controls, motion sensors and speech synthesizers as will be appreciated by those skilled in the art.

As will be described in detail below, in the operation of detector 8, the signals received by signal processor 10 are sampled and a list of data points is recorded which describes the changes in the signal versus time. The processor then calculates the Fast Fourier Transform of this data. The new data gives the strength of the signal at each frequency and the entire frequency spectrum is, therefore, known. The target frequencies can thus be identified. This technique gives the device the ability to detect multiple targets and reject clutter and interference unlike comparable analog systems which cannot achieve this goal. The radar thus has the ability to discriminate and select specific targets for further processing.

Figure 8:
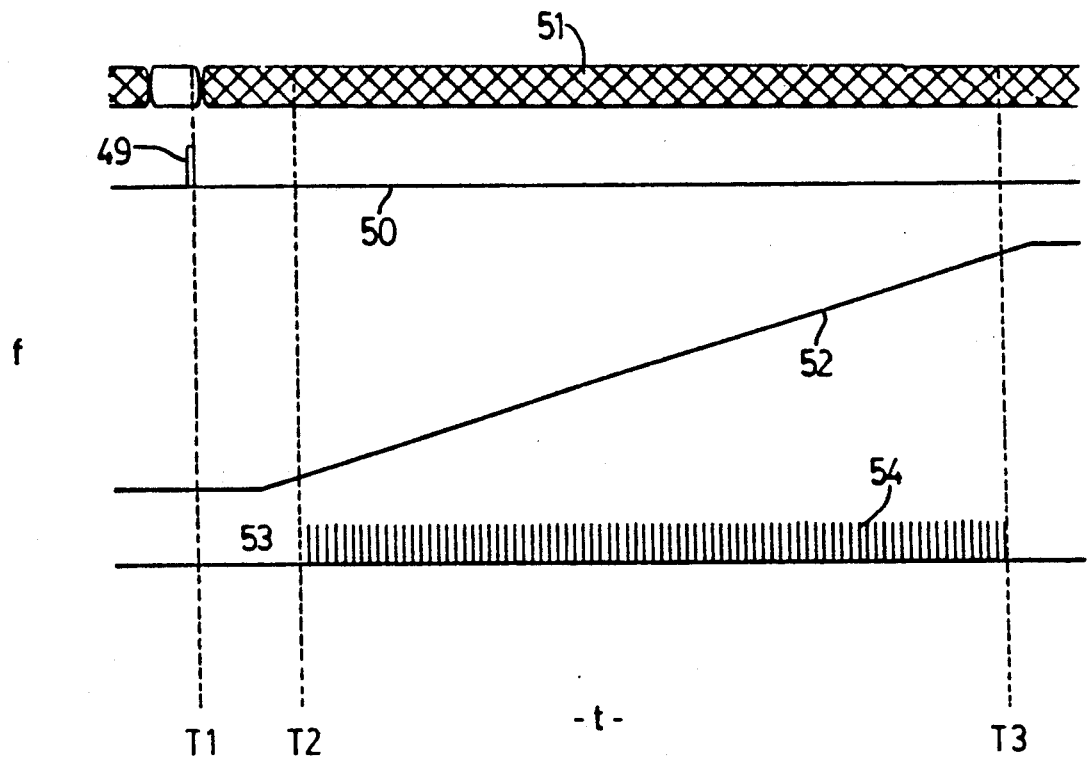
FIG. 8 is a graphical representation of the voltage and timing of the device output during a single modulation slope.
Figure 9:
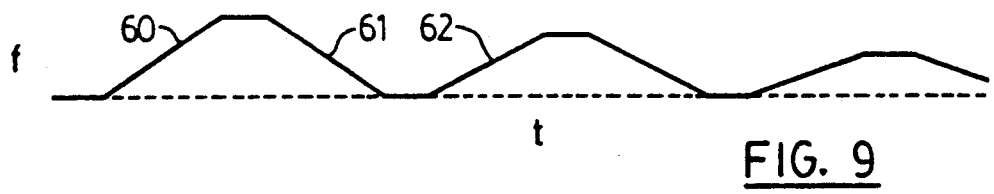
FIG. 9 is a graphical representation of the output frequency change during a single cycle.
Figure 10:
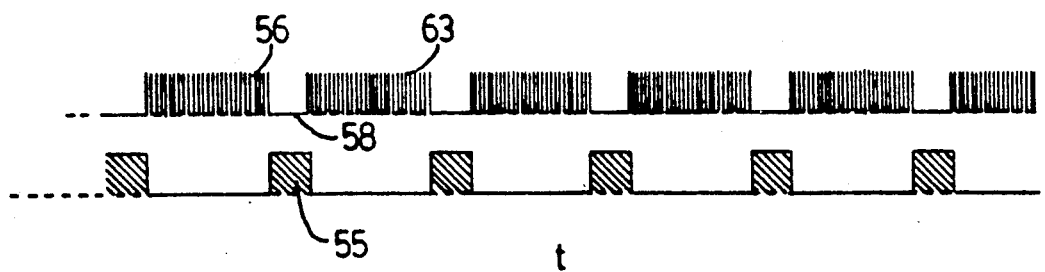
FIG. 10 is a graphical representation of the processor activity during multiple cycles.

FIGS. 8 to 10 show a typical timing diagram used in the operation of detector 8. Referring to FIG. 8, at time T1, a start pulse 49 is sent to modulator 12 as indicated on line 50. Modulation occurs in the shaded time period indicated by line 51. When the data is sent to the modulator, the frequency modulation ramp or slope begins at point 53. After a present delay, i.e., at time point T2, processor 10 starts to read A/D converter 30 as shown by line 54. After 128 samples are read into the processor, the A/D sampling stops, the modulation stops, and an FFT is calculated.

FIG. 9 shows the frequency versus time graph of multiple modulation cycles similar to the slope in FIG. 8. Each modulation slope 60, 61, 62 etc. is analogous to the modulation slope 52 in FIG. 8, except that each one has a different slope in Hz/second. For example, slope 60 could have a slope of 45 GHz/s, slope 61 could have a slope of −45 GHz/sec, slope 62 could be 32 GHz/sec, etc. Notice that the time for each slope is constant, T2 to T3 in FIG. 8. Any number of slopes can be used in one cycle if desired, but six slopes are usually sufficient for detector 8.

FIG. 10 shows the timing diagram for A/D converter 30 and the calculation of the FFT by processor 10. During a frequency slope, 60 for example, the beat frequency received by processor 10 is sampled 128 times as indicated by bar 56. During this time, the processor accepts the samples from A/D converter 30 and stores them in memory. After all 128 samples have been read by processor 10, the processor calculates an FFT as indicated by bar 55 converting the signals from the time domain to the frequency domain. The processor then finds the peaks in the frequency spectrum and records the corresponding frequency and power of the peak for further processing as will be illustrated below. The processor then triggers another slope and A/D convertor 30 begins another sampling cycle indicated by bar 63. The process of trigger, sampling, FFT calculation, frequency peak storage and trigger again continues until all the desired modulation slopes have been performed and the necessary data stored.

Figure 11:
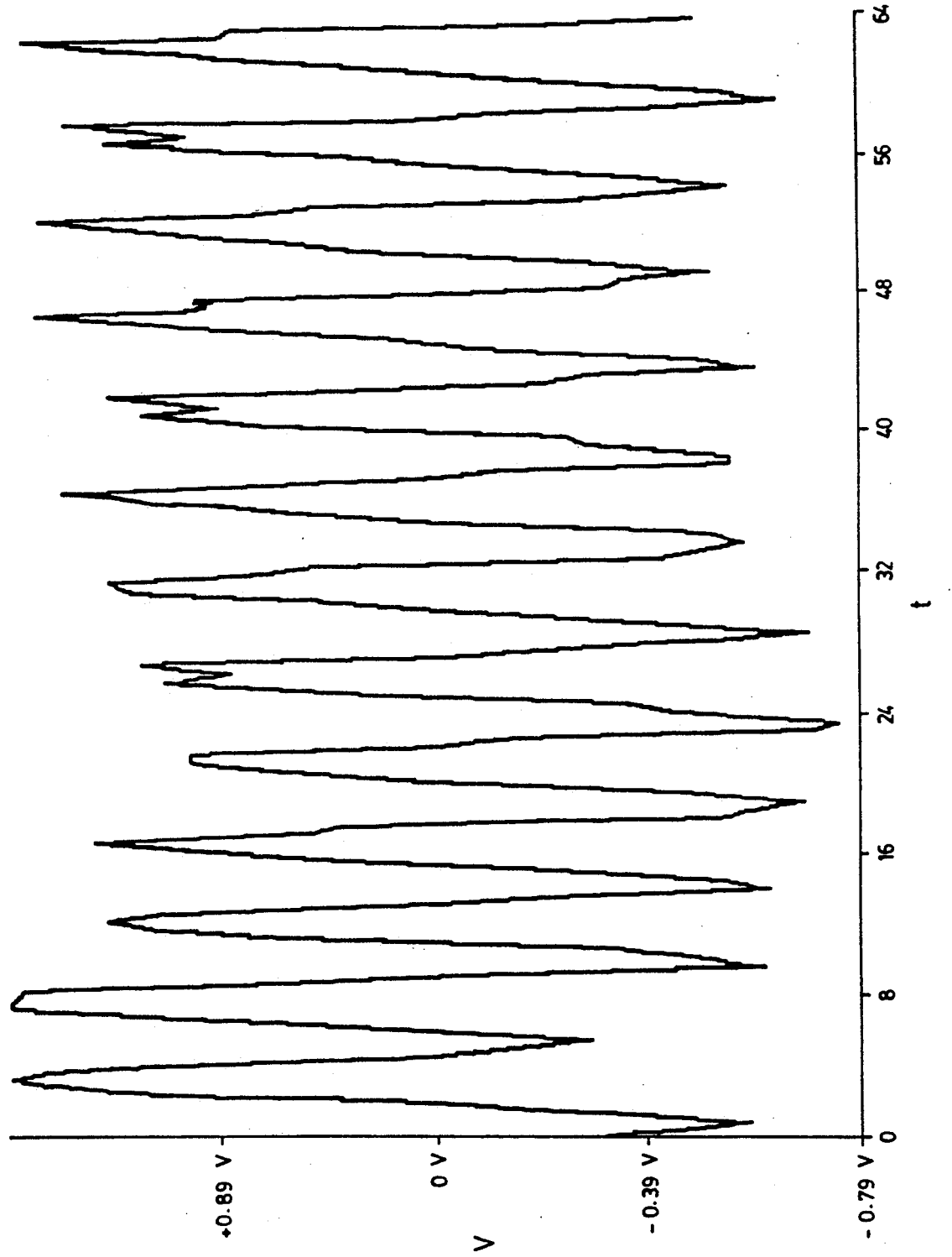
FIG. 11 is a graphical representation of the unprocessed output of the radar receiver having a single target and an extraneous object.
Figure 12:
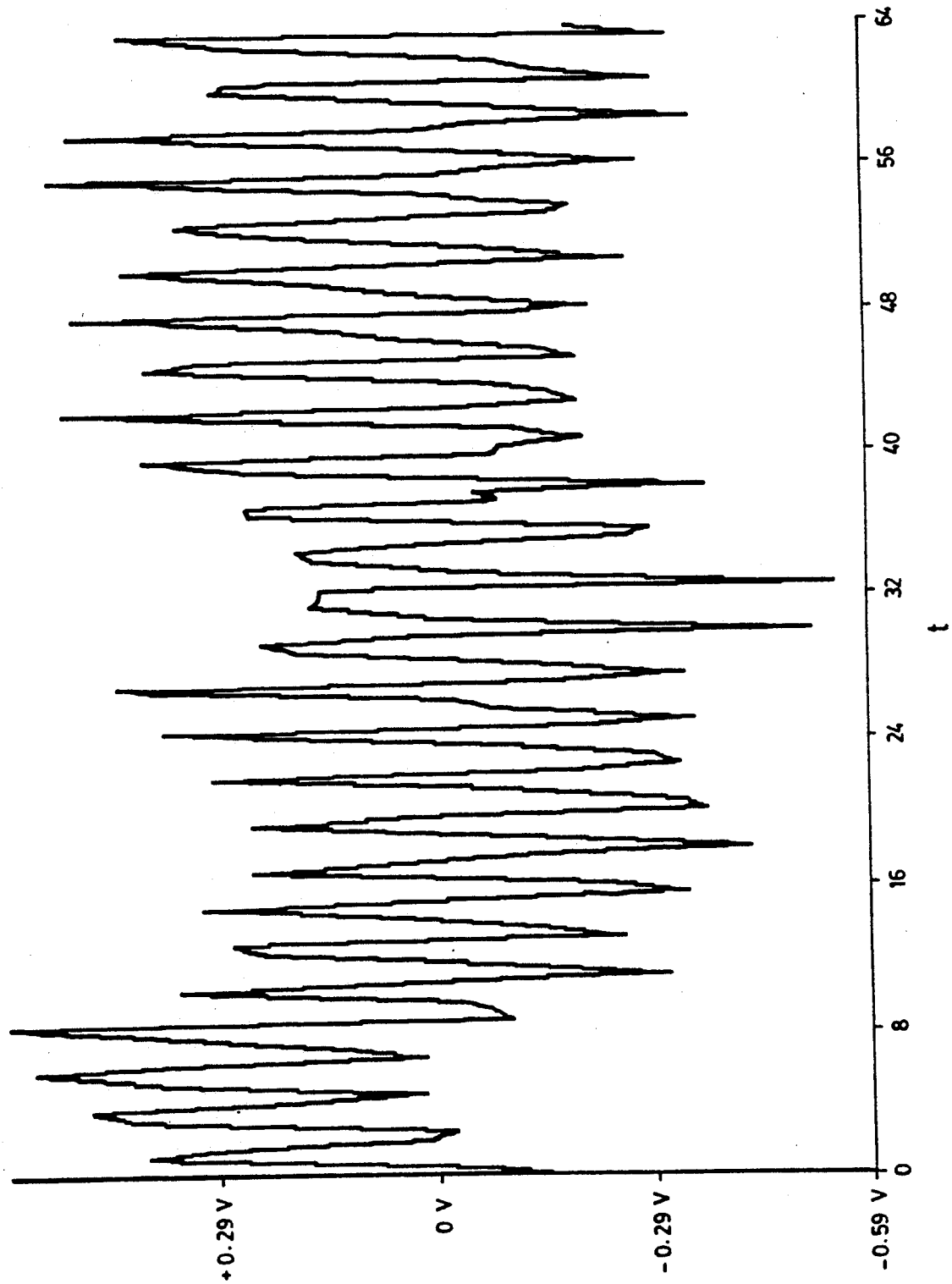
FIG. 12 is a graphical representation similar to FIG. 11, but wherein the single target is farther away.
Figure 13:
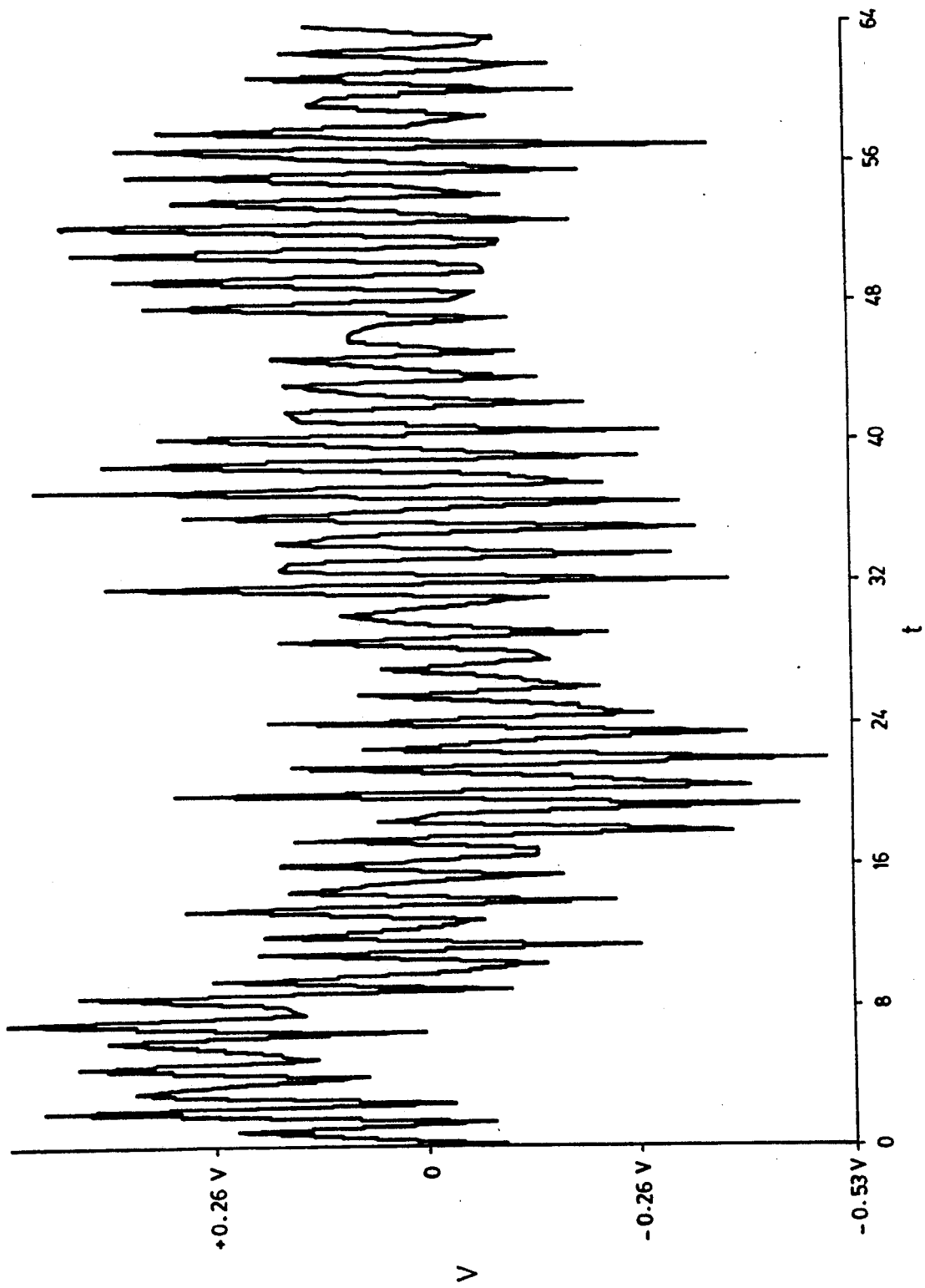
FIG. 13 is a graphical representation of the unprocessed output of the extraneous object of FIGS. 11 and 12.

FIG. 11 is a typical IF voltage waveform from a single slope with a test target at 100 feet and a stop sign at 328 feet plotted as amplitude or voltage versus time. FIG. 12 has the same stop sign at 328 feet, but with the test target at 200 feet. FIG. 13 shows the IF signal from the stop sign alone. The signal from the stop sign in FIG. 13 is lost in the much stronger signal from the test targets in FIGS. 11 and 12. The AGC of filters 28 makes the signal appear to be about the same voltage in the figures, but it is really 20 dB down. This alternate target recognition is the major problem for analog signal processors.

Figure 14:
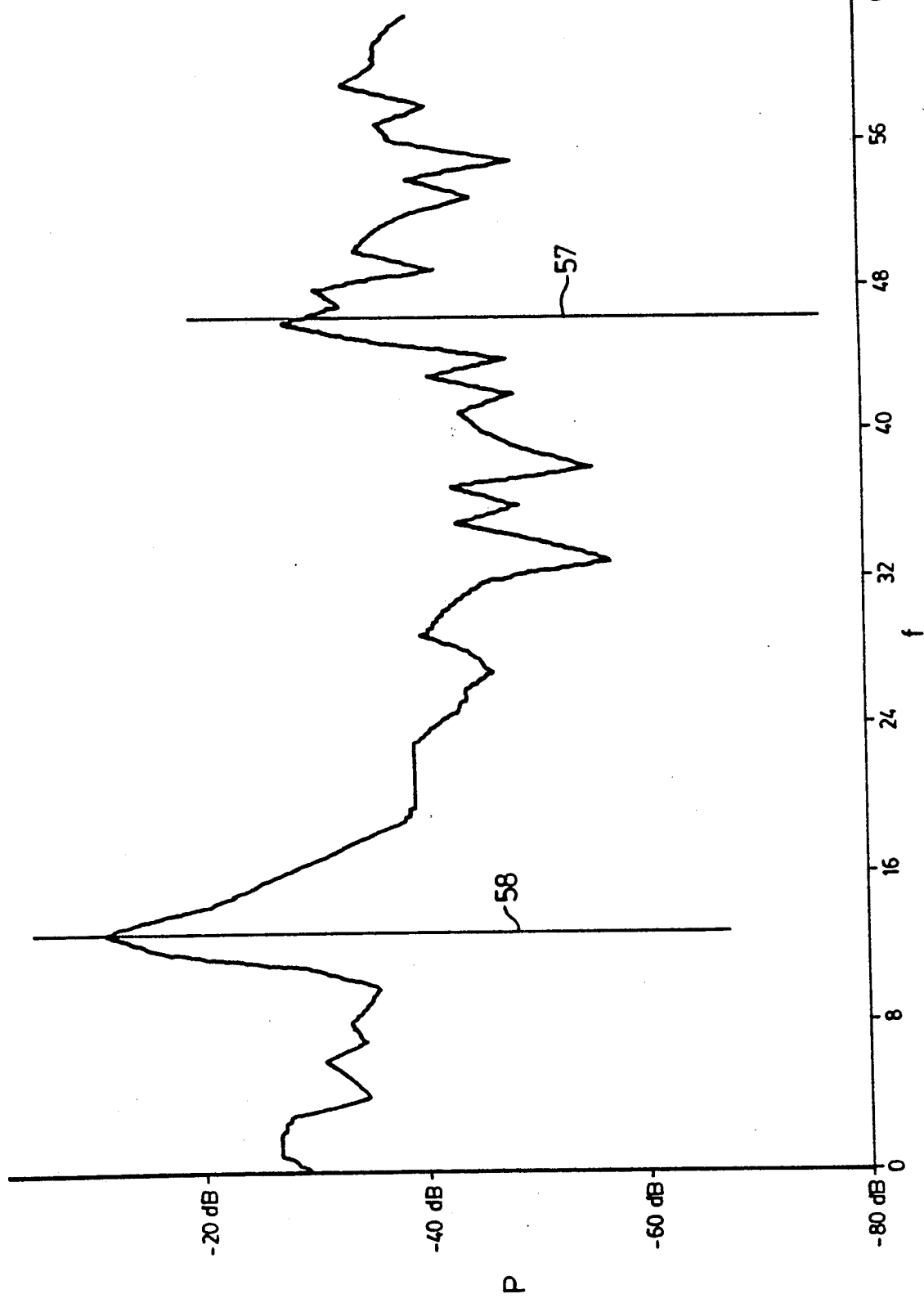
FIG. 14 is a graphical representation of the FFT output of the signal processor operating on the signal shown in FIG. 11.
Figure 15:
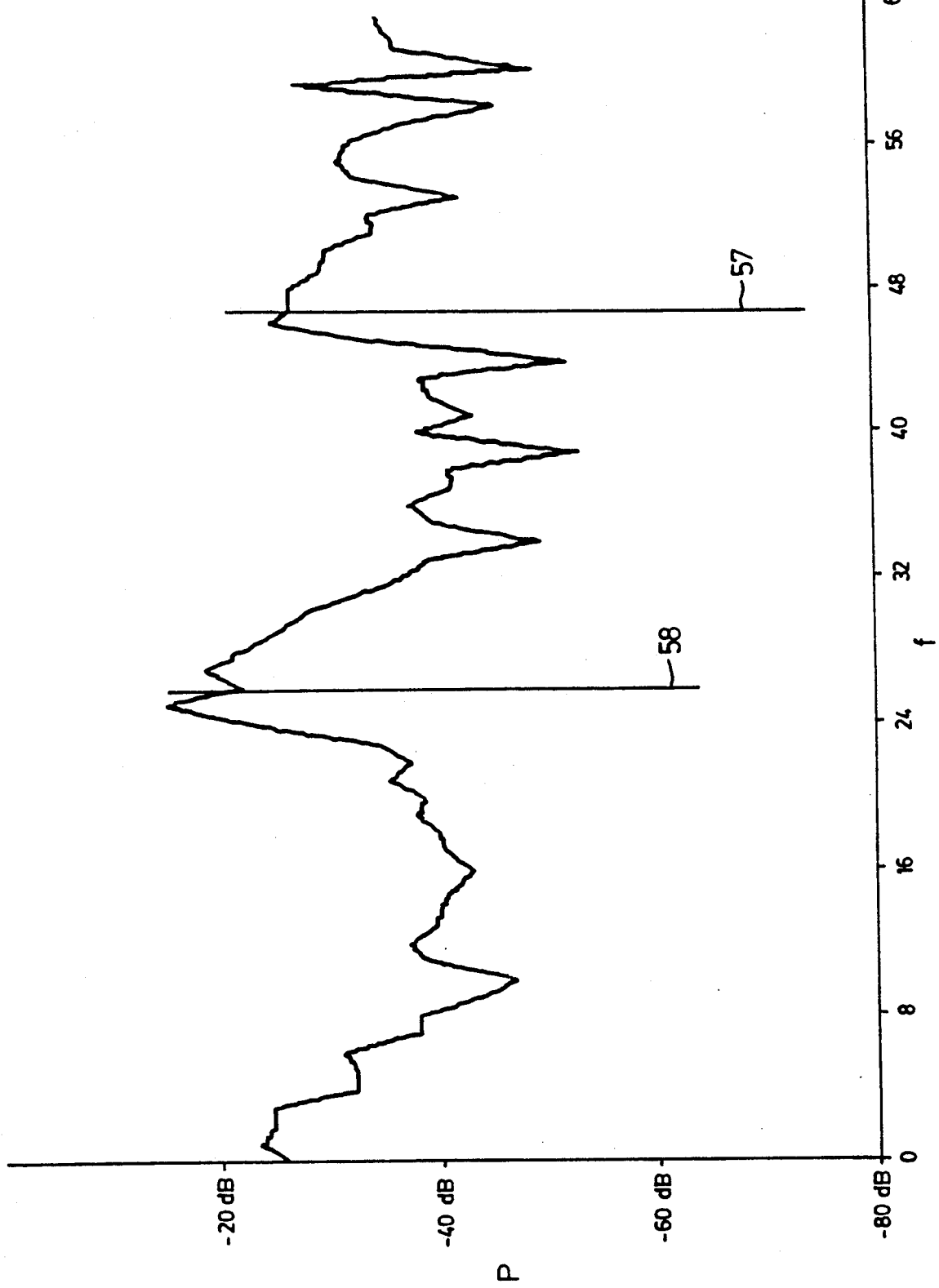
FIG. 15 is a diagrammatic representation of the FFT output of the signal processor operating on the signal shown in FIG. 12.
Figure 16:
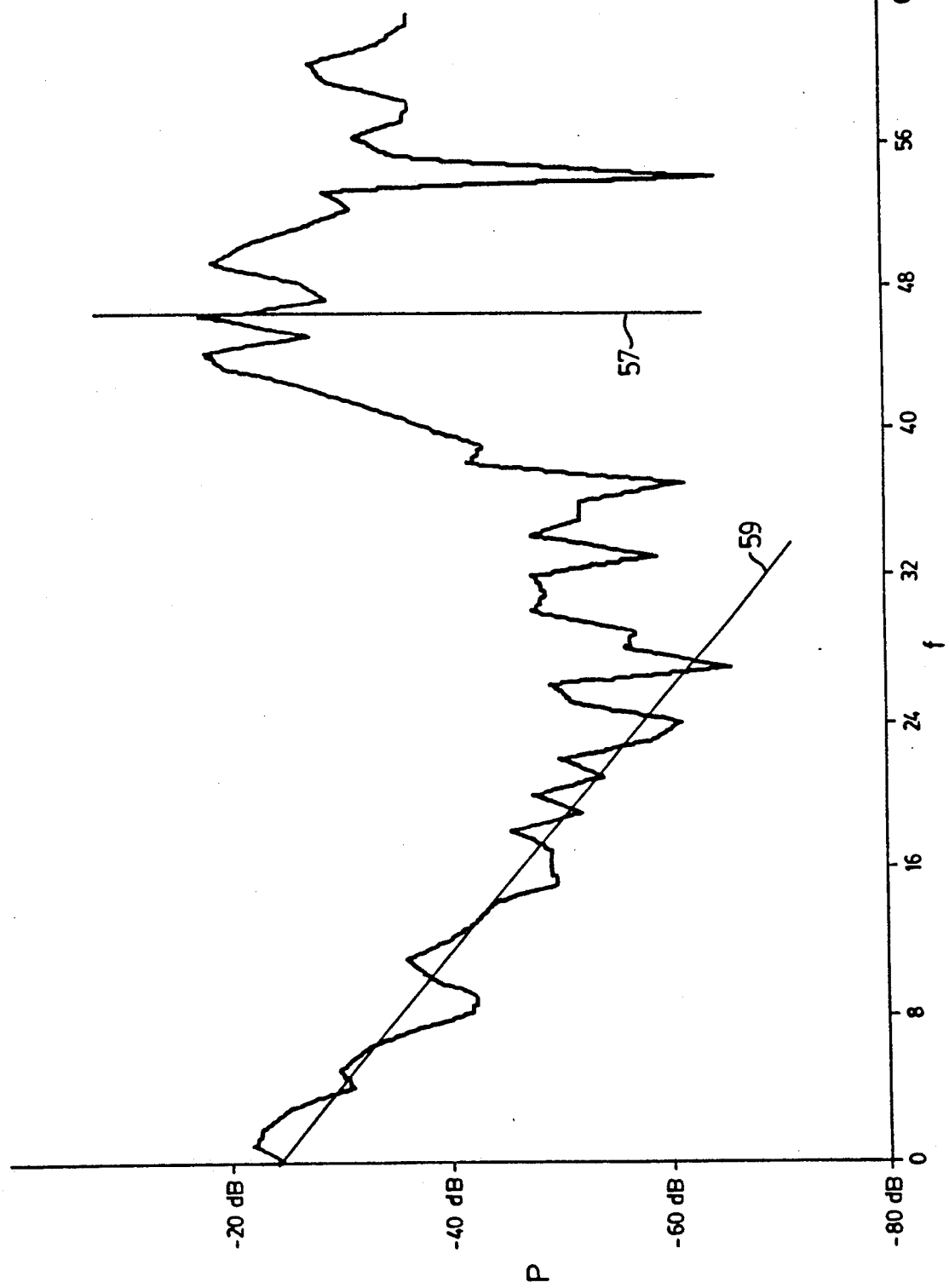
FIG. 16 is a diagrammatic representation of the FFT output of the signal processor operating on the signal shown in FIG. 13.

FIGS. 14 to 16 are plots of the FFT amplitude or power versus frequency of the very same data as shown in FIGS. 11 to 13, respectively. The stop sign is clearly visible in the frequency spectrum at point 57, the test target can be seen in FIGS. 14 and 15 at point 58. System generated clutter or noise can be seen in FIGS. 16 along line 59.

From the frequency spectrum calculated by the FFT, the peaks are found as indicated in FIGS. 14 to 16. Normally, each peak will be a target. The processor compares each frequency point in the FFT with the neighboring points. If the upper and lower frequency neighbors are decreasing steadily in power, this frequency is identified as a peak or target and stored for further use.

FIGS. 11 to 16 illustrate target recognition using a single slope. However, if only one slope is taken, the frequency detected normally contains information about range and Doppler speed. There is no way to determine how much is contributed by the range part and how much is contributed by the Doppler part. The unambiguous determination of range and Doppler speed of one target requires two slopes, and two resultant FFT spectrums, so that the equation on page 15 can be solved. If the two slopes are equal in magnitude, but differ in sign as shown in FIG. 6, the average frequency in the detected spectrum of both slopes would be the range part. The Doppler part would be one half the difference of the two frequencies in the two spectrums.

If multiple targets are present, each target would contribute a signal in the FFT spectrum. Resolving the range and Doppler ambiguities is therefore more complicated. For n targets, there are 2n variables, and n frequencies in each frequency modulation slope. In the preferred embodiment, a matrix of simultaneous equations would be constructed and solved to give the range and Doppler information about each target. However, if the signal processing capacity is not sufficient, a trial and error approach can be taken. In this latter approach the frequencies detected in the slope spectrums are first compared two by two, pairing the frequencies detected in adjacent slopes that differ by only their sign, for example an up slope of 45 GHz/s and a down slope of 45 GHz/s. If there are three frequencies contained in each slope, each frequency in one slope is compared against each of the three frequencies from the other slope and nine possible targets result, each with a speed and Doppler. Each of the nine possible targets from each pair is compared to the nine targets from the other slope pairs resulting in twenty-seven possible target pairings, each compared with each other to yield 729 different combinations.

Target pairs with a speed greater than 200 mph may be discarded and target pairs with a negative range may also be discarded. Additionally, target pairs with a range of greater than 400 meters may be discarded. This significantly reduces the 729 possible combinations to a few dozen.

Once each of the nine pairings has been investigated from each slope pair, and the undesirable pairings have been eliminated, the remaining pairings are compared to the other slope pairs to find two pairs, i.e., data that matches over four slopes, that have the same range and Doppler and return power. This target is stored as a suspect. When all the comparisons are complete, each suspect is checked against the third slope pair. If no match is found, it may mean that two target frequencies have collided in one Fourier frequency bin. This has a one in 32 chance of happening. Although small, the chance of this happening is still significant. If the suspect target, which is identified by the target speed, Doppler, and power return is not found in the third pairing, it is still retained but given a low priority. This means that if too many suspects match, and the microprocessor runs out of memory to store all these suspects, this one can be discarded. If it was a real target, it will reappear in the next cycle.

When the table of target suspects is complete, the safe stopping distance is calculated for each one The actual distances to the targets are then compared to the safe stopping distances and for each one where the actual distance is less than the safe stopping distance an alarm signal is produced. The highest alarm is stored, or displayed, and the measurement begins again with a brand new set of slopes and FFTs.

In the preferred embodiment, the alarm from each measurement cycle which comprises six slopes, six FFTs, the suspect target table creation and the alarm calculation is averaged over four cycles to eliminate random targets due to noise and momentary targets, which can be created when the vehicle is turning or is momentarily looking directly at a peripheral object such as a tree or sign. It has been found that all vehicle targets will return a power in a certain range. Bridges and buildings return too much power, and trees and guard rails return too little power. Target suspects with a power that is not within an accepted range can therefore be ignored.

Figure 17:
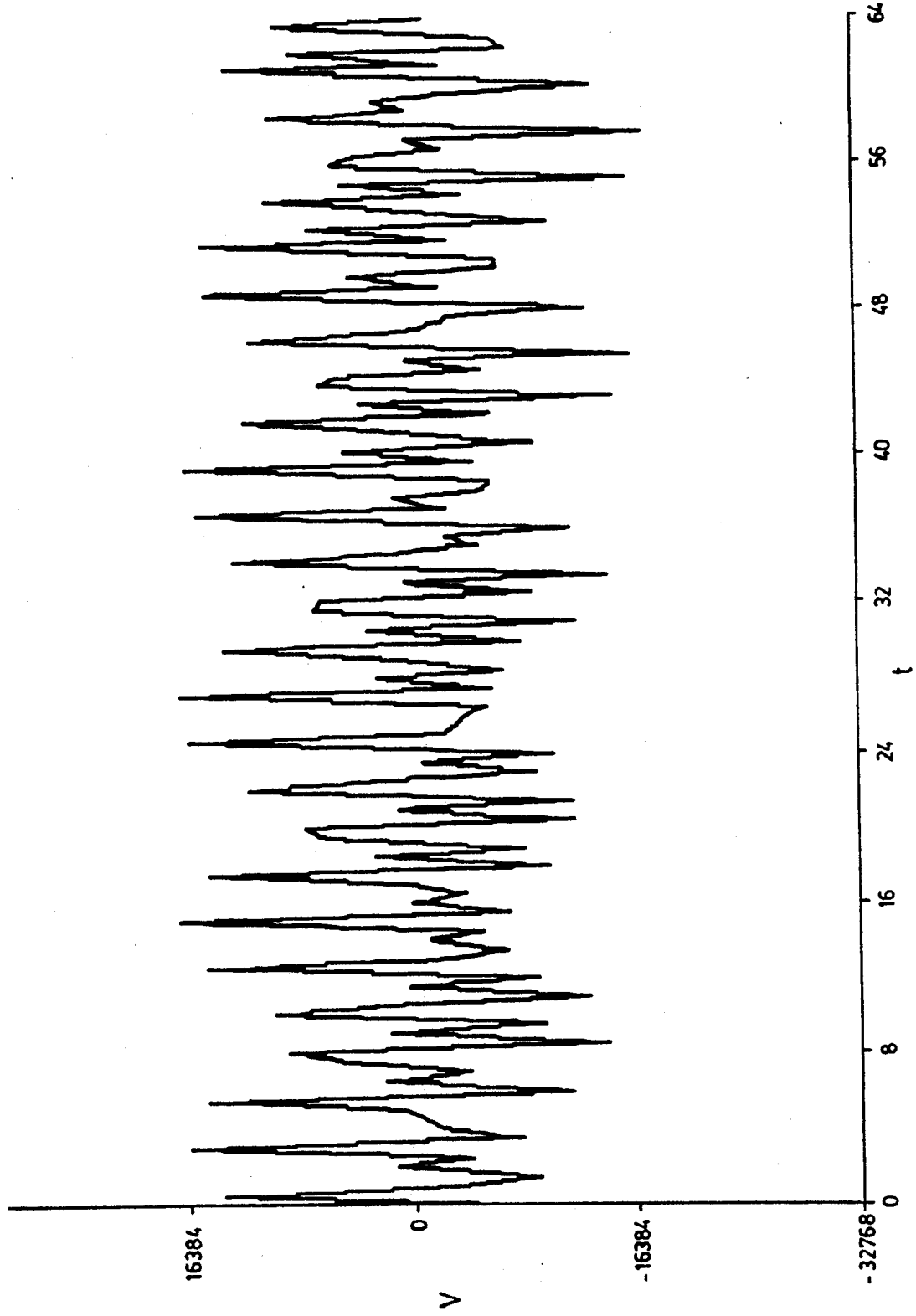
FIG. 17 is a graphical representation of the unprocessed output of the radar receiver which is viewing three targets.
Figure 18:
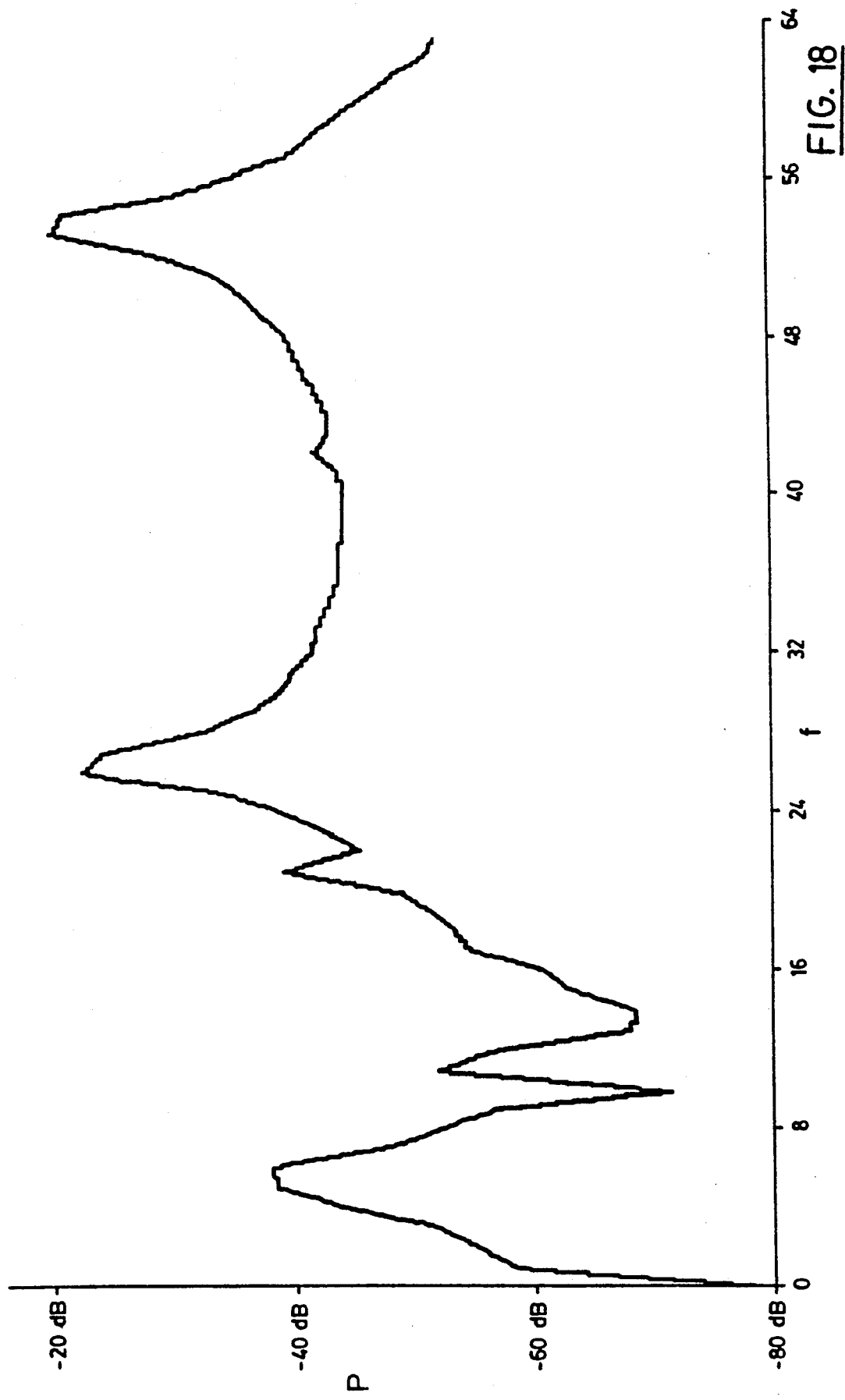
FIG. 18 is a graphical representation of the FFT output of the signal processor operating on the signal shown in FIG. 17.

FIGS. 17 and 18 illustrate another typical example of the operation of detector 8. In this example a vehicle with detector 8 is travelling about 60 kilometers per hour with three targets present. A stationary first target is about 75 meters away. A second target is 100 meters away with a speed of about 110 kilometers per hour moving in the same direction as the host vehicle. A third target is approaching at a ground speed of about 90 kilometers per hour and is 31 meters away. FIG. 17 is a plot of the voltage waveform of the three target frequencies added together. FIG. 18 shows the results of the FFT output. The weak signal at frequency 5.5 corresponds to target 1. This weak signal might go unnoticed in an analog detection system. The other two targets are clearly identified by the processor. This process is repeated with other slopes so that target ranges and Dopplers can be determined, safe stopping distances calculated and alarms sounded or displayed as desired. The whole procedure from start to finish using six slopes takes about 32 ms.

Having described preferred embodiments, it will be appreciated that various modifications could be made to the apparatus and methods described herein. For example, instead of using a tachometer for determining the host vehicle speed, a radar or Doppler signal could be picked up from the road or other stationary objects to determine the vehicle speed. Instead of determining safe stopping distances, detector 8 could simply be used to sense or locate obstacles in proximity to the host vehicle. Other types of antenna could be used, as well as other types of signal processors, filters, automatic gain controls and oscillators. Also, it will be appreciated that the detection of this invention could be used in any type of vehicle or other moving object, such as a boat, or train or even an airplane. The term vehicle for the purposes of this specification is intended to include any moving object that is desired to be stopped safely before hitting another object.

While preferred embodiments of the invention have been described, it is to be distinctly understood that the invention is not limited thereto, but may be otherwise embodied and practised within the scope of the following claims.

What is claimed is:

1. A safe stopping distance detector for a host vehicle, comprising:

an oscillator for generating continuous wave electromagnetic radar output signals;

a modulator operably coupled to the oscillator to modulate said output signals;

a signal processor operably coupled to the modulator to cause the modulator to produce multiple slope output signals from said oscillator, the slopes being produced in multiple pairs, the two slopes in each pair having opposite sign;

a transmit antenna adapted to be located for the transmission of radar signals in a predetermined direction;

a power splitter electrically connected between the oscillator and the transmit antenna;

a receive antenna adapted to be located to receive radar signals emanating from the transmit antenna and reflecting off obstacles;

a mixer electrically coupled between the power splitter and the receive antenna for producing a beat frequency for each modulation slope;

said signal processor being electrically coupled to the mixer, the signal processor including means for analyzing the beat frequency for each slope to produce a signal for each possible obstacle, mans for matching said signals in successive pairs, means for identifying recurring signals corresponding to real obstacles, means for calculating the distances to said real obstacles, means for determining if said host vehicle can stop within said distances; and means coupled to the signal processor for producing an alarm if the host vehicle cannot stop within said distances.

2. A safe stopping distance detector as claimed in claim 1 wherein six of said slopes are produced.

3. A safe stopping distance detector as claimed in claim 1 wherein said slopes in successive pairs have different rates in frequency per second in each pair.

4. A safe stopping distance detector as claimed in claim 1 and further comprising a frequency multiplier coupled between the oscillator and the power splitter.

5. A safe stopping distance detector as claimed in claim 1 and further comprising an analog to digital converter coupled between the mixer and the signal processor.

6. A safe stopping distance detector as claimed in claim 5 wherein the analyzing means comprises means for producing Fast Fourier Transform data from the beat frequencies.

7. A safe stopping distance detector as claimed in claim 6 wherein the matching means includes means for comparing the Fast Fourier Transform data from successive slopes and selecting matching data.

8. A safe stopping distance detector as claimed in claim 7 and further comprising means for eliminating Fast Fourier Transform data outside a predetermined range.

9. A safe stopping distance detector as claimed in claim 1 and further comprising a filter coupled between the oscillator and the power splitter.

10. A safe stopping distance detector as claimed in claim 1 and further comprising filters coupled between the mixer and the signal processor.

11. A safe stopping distance detector as claimed in claim 10 wherein the filters include two high pass filters and a low pass filter.

12. A safe stopping distance detector as claimed in claim 1 and further comprising a user control means coupled to the signal processor for adjusting sensitivity.

13. A safe stopping distance detector as claimed in claim 1 wherein the alarm means includes a multi-level alarm in proportion to the difference between the distance to the obstacle and the vehicle safe stopping distance.

14. A safe stopping distance detector as claimed in claim 13 wherein the alarm includes both a visual and an audible alarm.

15. A method of determining a safe stopping distance between a host vehicle and target objects, the method comprising the steps of:

providing a continuous wave, frequency modulated radar device on the host vehicle to transmit and receive radar signals reflected off said objects;

modulating said radar signal to produce a plurality of pairs of modulation slopes the two slopes of each pair having opposite sign, and the slopes in successive pairs having different rates in frequency per second;

matching the transmitted signal with the received signal to produce beat frequencies for each modulation slope;

converting the beat frequencies to digital data;

performing a Fast Fourier Transform on the digital data to produce frequency domain data;

matching the frequency domain data relating to reach slope to identify recurring frequencies corresponding to target objects;

calculating the distances to the target objects and the distance to stop the host vehicle; and emitting an alarm if the distance to a target object is less than the host vehicle stopping distance.

16. A method as claimed in claim 15 wherein the frequency domain data for each slope is matched by comparing all combinations of frequency domain data and eliminating comparisons that are outside a predetermined range.

17. A method as claimed in claim 15 wherein the frequency domain data for each slope is matched by establishing a matrix of simultaneous equations and solving said equations to produce target range and Doppler information.

* * * * *